3,514,257
PROCESS FOR PRODUCING METABORIC ACID BY DEHYDRATING ORTHOBORIC ACID
Rudolph Rosenthal, Broomall, and Giovanni A. Bonetti, Wynnewood, Pa., assignors to Atlantic Richfield Company, Philadelphia, Pa., a corporation of Pennsylvania
No Drawing. Filed Jan. 19, 1968, Ser. No. 699,054
Int. Cl. C01b 35/00
U.S. Cl. 23—149
9 Claims

ABSTRACT OF THE DISCLOSURE

Method for the dehydration of orthoboric acid to metaboric acid by heating the acid in the presence of a hydrocarbon solvent and a $C_2$ to $C_6$ monocarboxylic acid and removing the water as an azeotropic mixture.

BACKGROUND OF THE INVENTION

Field of the invention

This invention relates to the dehydration of orthoboric acid to metaboric acid. More particularly, it relates to a dehydration method in the presence of a $C_2$ to $C_6$ monocarboxylic acid and a hydrocarbon solvent for azeotroping the water produced by the dehydration reaction.

PRIOR ART

In recent years processes have been developed for the oxidation of hydrocarbons in the presence of boric acids to produce alcohols. The boric acid recovered from these processes after hydrolysis of the intermediate borate esters is in the form of orthoboric acid ($H_3BO_3$). It has been found preferable that the boric acid recycled to the oxidation reaction be in the form of metaboric acid ($HBO_2$) since this form of the acid contains less water and gives better results in the oxidation. It has been known previously to carry out this dehydration at elevated temperatures, i.e. of the order of 110° C. to 160° C. The high temperature dehydration, however, gives a product having a physical form which renders it difficult to handle in the recycle operation, i.e. it generally is in the form of agglomerates.

Recently there has been proposed a dehydration process wherein the orthoboric acid is dehydrated by suspending it in an aromatic solvent and azeotroping the water formed during the dehydration reaction. If benzene is employed as the solvent, the reaction temperature (i.e. approximately the boiling point of benzene) is so low that the reaction proceeds very slowly. If higher boiling aromatic solvents are employed in order to obtain higher reaction temperatures and thus faster rates, the problem of the undesirable physical form of the metaboric acid produced again arises.

The instant method not only eliminates the use of high temperatures and produces a metaboric acid which is finely divided and completely satisfactory for recycle to the oxidation reaction, but it also gives the rapid reaction heretofore only associated with high temperatures.

SUMMARY OF THE INVENTION

In accordance with the instant invention the orthoboric acid is dehydrated to metaboric acid by heating at temperatures below about 110° C. and above about 80° C. in the presence of a hydrocarbon solvent and a $C_2$ to $C_6$ monocarboxylic acid. The water is azeotroped from the reaction mixture approximately as fast as formed.

It is an object of this invention therefore to provide a method for the low temperature dehydration of orthoboric acid to metaboric acid.

It is another object of this invention to provide a method for the dehydration of orthoboric acid to metaboric acid having a form suitable for recycling to hydrocarbon oxidation reactions.

It is another object of this invention to provide a method for the dehydration of orthoboric acid to metaboric acid utilizing a hydrocarbon solvent and a monocarboxylic acid.

Other objects of this invention will be apparent from the description of the preferred embodiments which follows and from the claims.

DESCRIPTION OF THE PREFERRED EMBODIMENTS

The hydrocarbon solvents which can be utilized in this invention are those boiling below about 110° C. Thus, although some hydrocarbons boiling very near this limit form azeotropes which boil at a lower temperature, the amount of water being formed is so small that, in general, the temperature in the reaction vessel will be at approximately the boiling point of the solvent. Consequently, if a solvent is used which boils higher than 110° C. it is not suitable for use in the process of this invention since as has been stated high temperatures tend to produce a product having an undesirable physical form.

Solvents boiling below about 80° C. can be used, however, these are not preferred. For example, pentane and hexane are not preferred since they boil at temperatures which are so low that the reaction rate is unduly long even when utilizing the method of this invention. Hydrocarbon solvents which are suitable include 3-ethylpentane; 2- or 3-methylhexane; cyclohexane; cyclohexene; methylcyclohexane; 4-methylcyclohexene; heptane; the heptenes; 2,2,4-trimethylpentane ("isooctane") and benzene. It will be noted that all of these solvents boil in the range of from about 80° C. to below 110° C. In general, any hydrocarbon solvent boiling between about 80° C. and below about 110° C., i.e. 80° to 105° C. preferably, whether aliphatic or aromatic can be used.

The carboxylic acids which are suitable for use in this invention are those having from 2 to 6 carbon atoms, in particular the monocarboxylic acids including acetic acid, propionic acid, butyric acid, valeric acid and caproic acid.

The reaction is carried out at reflux temperatures i.e., at about 80° C. to below about 110° C. since the solvent is the major liquid ingredient of the reaction mixture and therefore reflux temperatures are approximately the boiling point of the solvent. In general, reflux temperatures of 80° C. to 105° C. are preferred.

The amount of solvent which is employed is not critical except that sufficient solvent should be present to suspend the orthoboric acid conveniently and to provide for the formation of an azeotrope with water. In general, the weight ratio of solvent to orthoboric acid should range from about 2:1 to 6:1. Larger amounts of solvent may be used but are not advantageous and merely add unnecessary volume to the reaction vessel.

The amount of acid employed can range from 1 weight percent to 100 weight percent based on the weight of the orthoboric acid. Larger amounts also can be used but do not give any particular advantage. A preferred range is from about 5 weight percent to about 20 weight percent acid based on the weight of the orthoboric acid being dehydrated. In general times ranging from about 2 to about 8 hours are sufficient.

The following examples are provided to illustrate the invention in greater detail but these should not be construed as limiting the invention.

EXAMPLE I

A 500 ml. round bottom flask was fitted with a mechanical stirrer, thermometer and a 12-inch glass helices-packed column. To the top of the column was attached a Dean-Stark trap and a water-cooled condenser. The trap was modified with a stopcock in order to withdraw the water trapped therein. There was placed 24.8 grams of orthoboric acid and 100 ml. of benzene in the round bottom flask. An additional 25 ml. of benzene was placed in the Dean-Stark trap. The flask was heated to reflux temperature (about 81° C.) with stirring and the water was collected in the Dean-Stark trap. The rate of water removal is shown in Table I. At the end of 24 hours the mixture was cooled, filtered, and the solid was washed with benzene and warmed under vacuum to remove the benzene. The product weighed 18.3 grams and had a boron content of 23.0 weight percent. The weight percent of boron in pure metaboric acid ($HBO_2$) is 24.6. Infrared analysis showed that the product was mainly metaboric acid contaminated with a small amount of orthoboric acid.

A second run was carried out in the same manner except that 2.4 grams of glacial acetic acid was added to the boric acid-benzene mixture. The rate of water removal is also shown in Table I. At the end of seven hours the mixture was cooled, filtered, washed with benzene and then warmed under vacuum to remove the benzene. The product weighed 17.6 grams and analyzed 24.5 weight percent boron. Infrared analysis showed the product to be metaboric acid.

TABLE I

| Time (hrs.) | Run 1, ml. of water collected | Run 2, ml. of water collected |
|---|---|---|
| 1 | 0.8 | 2.0 |
| 2 | 1.6 | 4.0 |
| 3 | 2.4 | 5.5 |
| 4 | 3.2 | 7.0 |
| 5 | 3.9 | 8.0 |
| 6 | 4.6 | 8.5 |
| 7 | 5.2 | 8.8 |
| 8 | 5.7 | |
| 24 | 6.8 | |

It will be seen by comparing these two runs that when acid is employed not only is the reaction greatly accelerated but the product obtained is in a purer form.

EXAMPLE II

Another run was made in the same manner as the second run of Example I except that 24.0 grams of glacial acetic acid was added to the boric acid-benzene mixture. The rate of water removal is shown in Table II. The mixture was cooled, filtered, the finely divided solid washed with benzene and thereafter warmed under vacuum to remove the benzene. The product weighed 17.6 grams and analyzed pure metaboric acid.

TABLE II

| Time (hrs.): | Run 3, ml. of water collected |
|---|---|
| 1 | 3.0 |
| 2 | 6.0 |
| 3 | 8.7 |
| 3.5 | 9.1 |
| 4 | 9.1 |
| 5 | 9.1 |

A comparison of the rate of water removal with run No. 2 of Example I shows that an increase in rate is obtained using a larger amount of acid, however, the increase in rate is not proportional to the increase in the amount of acid employed.

EXAMPLE III

A run was made in the same manner as run No. 2 of Example I except that 3.0 grams of propionic acid was employed instead of the acetic acid. The product obtained by the same procedure as in Examples I and II was metaboric acid. The results are shown in Table III.

TABLE III

| Time (hrs.): | Run 4, ml. of water collected |
|---|---|
| 1 | 2.0 |
| 2 | 4.0 |
| 3 | 6.0 |
| 4 | 7.2 |
| 5 | 7.2 |

The results show that the rate obtained with propionic acid is essentially the same as that with acetic acid.

As many possible embodiments can be made of this invention without departing from the broad scope thereof, it is to be understood that all matter herein set forth is to be interpreted as illustrative and not as unduly limiting the invention.

We claim:
1. A method for the dehydration of orthoboric acid to metaboric acid which comprises heating to reflux temperatures orthoboric acid suspended in a hydrocarbon solvent having a boiling point below about 110° C. in the presence of a monocarboxylic acid having from 2 to 6 carbon atoms in the molecule and removing the water formed as a hydrocarbon solvent-water azeotrope.
2. The method according to claim 1 wherein the hydrocarbon solvent boils between about 80° C. and 105° C.
3. The method according to claim 1 wherein the hydrocarbon solvent is benzene.
4. The method according to claim 1 wherein the weight ratio of hydrocarbon solvent to orthoboric acid is in the range of 2:1 to 6:1.
5. The method according to claim 1 wherein the amount of monocarboxylic acid is in the range of from 1 weight percent to 100 weight percent based on the weight of the orthoboric acid.
6. The method according to claim 1 wherein the monocarboxylic acid is acetic acid.
7. The method according to claim 1 wherein the monocarboxylic acid is propionic acid.
8. The method according to claim 1 wherein the hydrocarbon solvent is benzene, the monocarboxylic acid is acetic acid, the weight ratio of solvent to benzene is in the range of 2:1 to 6:1 and the amount of acetic acid is in the range of from 1 weight percent to 100 weight percent based on the weight of the orthoboric acid.
9. The method according to claim 1 wherein the hydrocarbon solvent is benzene, the monocarboxylic acid is propionic acid, the weight ratio of solvent to benzene is in the range of 2:1 to 6:1 and the amount of propionic acid is in the range of from 1 weight percent to 100 weight percent based on the weight of the orthoboric acid.

References Cited

UNITED STATES PATENTS 3,275,695  9/1966  Marcell _____ 23—149 X
3,397,954  8/1968  Russell et al. _____ 23—149

HERBERT T. CARTER, Primary Examiner